(12) United States Patent
Chen et al.

(10) Patent No.: US 10,679,040 B2
(45) Date of Patent: Jun. 9, 2020

(54) NON-NEGATIVE MATRIX FACTORIZATION FACE RECOGNITION METHOD AND SYSTEM BASED ON KERNEL MACHINE LEARNING

(71) Applicant: SHENZHEN UNIVERSITY, Guangdong (CN)

(72) Inventors: Wensheng Chen, Guangdong (CN); Yang Zhao, Guangdong (CN); Bo Chen, Guangdong (CN); Binbin Pan, Guangdong (CN)

(73) Assignee: SHENZHEN UNIVERSITY, Guangdong (CN)

(*) Notice: Subject to any disclaimer, the term of this patent is extended or adjusted under 35 U.S.C. 154(b) by 134 days.

(21) Appl. No.: 15/769,741

(22) PCT Filed: Feb. 15, 2017

(86) PCT No.: PCT/CN2017/073675
§ 371 (c)(1),
(2) Date: Apr. 20, 2018

(87) PCT Pub. No.: WO2017/166933
PCT Pub. Date: Oct. 5, 2017

(65) Prior Publication Data
US 2018/0307901 A1    Oct. 25, 2018

(30) Foreign Application Priority Data
Mar. 30, 2016 (CN) .......................... 2016 1 0192602

(51) Int. Cl.
*G06K 9/00* (2006.01)
*G06K 9/62* (2006.01)
*G06T 7/33* (2017.01)

(52) U.S. Cl.
CPC ..... *G06K 9/00288* (2013.01); *G06K 9/00268* (2013.01); *G06K 9/6239* (2013.01);
(Continued)

(58) Field of Classification Search
CPC ........... G06K 9/00268; G06K 9/00288; G06K 9/6239; G06K 9/6256; G06K 9/6268;
(Continued)

(56) References Cited

U.S. PATENT DOCUMENTS

2008/0199075 A1    8/2008 Gokturk et al.
2008/0310687 A1   12/2008 Hua et al.

FOREIGN PATENT DOCUMENTS

CN    102592148    7/2012
CN    102930258    2/2013
(Continued)

OTHER PUBLICATIONS

Buciu, Ioan, Nikos Nikolaidis, and Ioannis Pitas. "Nonnegative matrix factorization in polynomial feature space." IEEE Transactions on Neural Networks 19.6 (2008): 1090-1100. (Year: 2008).*
(Continued)

*Primary Examiner* — Nirav G Patel
(74) *Attorney, Agent, or Firm* — JCIPRNET

(57) ABSTRACT

The invention provides a non-negative matrix factorization face recognition method and system based on kernel machine learning, which comprises five steps. The invention has the following beneficial effects: the invention avoids the learning of the inaccurate pre-image matrix by directly learning two kernel matrices, $K_{wx}$ and $K_{ww}$, and avoids the derivation of the kernel function in the iterative formula by changing the learning object, so that there is no limit to the selection of kernel function and a general algorithm for any kernel function is obtained.

8 Claims, 3 Drawing Sheets

(52) U.S. Cl.
CPC ......... *G06K 9/6256* (2013.01); *G06K 9/6268* (2013.01); *G06T 7/337* (2017.01); *G06T 2207/20081* (2013.01); *G06T 2207/20084* (2013.01); *G06T 2207/30201* (2013.01)

(58) Field of Classification Search
CPC . G06T 2207/20081; G06T 2207/20084; G06T 2207/30201; G06T 7/337
See application file for complete search history.

(56) References Cited

FOREIGN PATENT DOCUMENTS

| | | |
|---|---|---|
| CN | 103366182 | 10/2013 |
| CN | 105893954 | 8/2016 |

OTHER PUBLICATIONS

"International Search Report (Form PCT/ISA/210)", dated May 15, 2017, with English translation thereof, pp. 1-4.

* cited by examiner

NON-NEGATIVE MATRIX FACTORIZATION FACE RECOGNITION METHOD AND SYSTEM BASED ON KERNEL MACHINE LEARNING

CROSS-REFERENCE TO RELATED APPLICATION

This application is a 371 application of the international PCT application serial no. PCT/CN2017/073675, filed on Feb. 15, 2017, which claims the priority benefit of China application no. 201610192602.0, filed on Mar. 30, 2016. The entirety of each of the abovementioned patent applications is hereby incorporated by reference herein and made a part of this specification.

BACKGROUND OF THE INVENTION

Technical Field

The invention relates to the field of computer technology, and more particularly, to a non-negative matrix factorization face recognition method and system based on kernel machine learning.

Description of Related Art

In the field of computer vision and pattern recognition, face recognition has become popular in research. In many aspects of criminal investigation, identification and video surveillance, face recognition technology has become an important application, and these aspects are closely related with people's lives. Therefore, the present patent has an important theoretical and practical value for the research of non-linear non-negative matrix factorization face recognition algorithm based on kernel method.

The face recognition technology can be traced back to the late 19$^{th}$ century. As the technology continues to evolve, in some of prior face recognition technologies, a popular method is to represent the raw data with a set of baselines. The specific form is to decompose the data matrix formed by the original data into the product of two matrices. Lee and Seung proposed a non-negative matrix factorization (NMF) algorithm based on non-negative constraints. The NMF algorithm decomposes the non-negative matrix X into X=WH, wherein W is a basis matrix, H is a coefficient matrix, and the two matrices are both non-negative. Specifically, the algorithm is a constrained optimization problem, which guarantees the non-negativeness of all elements in the result that the objective function satisfies the decomposition. The solution to the objective function is an iterative formula obtained by the gradient descent method. The algorithm is simple to implement, and can guarantee that the result of the decomposition will not be negative, which is also consistent with the non-negative gray scale of face images.

The non-negative matrix factorization algorithm is a classic linear feature extraction and dimension reduction method, and when we apply to face recognition, because of the different illumination of face images, different gestures, different expressions and other factors, the data of the face image are very complicated in the pattern space and often show a non-linear distribution, so these linear methods are hard to have good effects in dealing with non-linear problems. To solve the problem of non-linearity of face recognition, researchers have proposed some non-linear methods. The most popular one is the kernel method. The basic idea of the kernel method is to map the original sample into a high-dimensional kernel space F using non-linear mapping and then classify it in the kernel space using linear methods. However, there are two main problems with the kernel method. On one hand, the dimensionality of the kernel space F is generally much larger than the dimensionality of the original sample space, and even infinite dimension; on the other hand, it is very difficult for people to find an analytic expression of the non-linear mapping of the kernel method. Fortunately, these problems can be solved by a kernel trick. The linear method appears mainly in the form of inner product of non-linear mapping image in the kernel space, and the inner product can be represented by kernel function. The representative kernel functions include RBF kernel and polynomial kernel. The non-negative matrix factorization algorithm which is extended to the kernel space to solve the non-linear problem of face recognition is the kernel non-negative matrix factorization (KNMF) algorithm. The main idea of the KNMF algorithm is to represent the non-linearly mapped sample $\varphi(X)$ as $\varphi(X)=\varphi(W)H$ with a set of baselines in a high-dimensional space, wherein the coefficient H, which is linearly expressed in a high-dimensional space, is a new feature of the original sample. The results show that the performance of non-negative matrix factorization algorithm based on the kernel method is better than that of the linear method.

Buciu, I. and Nikolaidis, N., et al. made a great contribution and proposed a polynomial kernel-based non-negative matrix factorization (PNMF). In PNMF, the samples are first mapped into the polynomial kernel space, and then a non-negative coefficient matrix and a set of non-negative basis images are found, so that the non-linearly mapped training samples can be linearly represented by the non-linearly mapped basis images. The iterative formulas of the pre-image matrix and feature matrix are obtained by the gradient descent method. This algorithm can successfully generate a non-linear non-negative matrix factorization algorithm. However, because of the derivation of the kernel function during the iteration process, a non-linear algorithm is designed for the polynomial kernel and not suitable for other kernel functions.

In order to solve such a problem, Zafeiriou S. and Petrou M. proposed a projection gradient kernel non-negative matrix factorization (PGKNMF) based on the PNMF algorithm. The algorithm re-establishes a new objective function for the pre-image matrix, thus avoiding the derivation of the kernel function; the convergence point of the algorithm is fixed, and the use of the kernel function is not limited, but the algorithm still needs to learn the pre-image inaccurately, and the iterative formula is more complicated, so experimental results will still be affected.

In recent years, some scholars also continue to improve the NMF algorithms, most of which only modify the objective function. To sum up, some existing NMF algorithms based on kernel machine learning need to learn the pre-images inaccurately and also have more stringent requirements on the choice of the kernel function, so the algorithms cannot be generalized for any kernel function and are more complicated.

In the prior art:

1. Kernel method: The core idea of the kernel method is to find a non-linear mapping, to map the linear inseparable data to a high-dimensional space F, making it linearly separable in this high-dimensional space F; then classify it in this high-dimensional space F in a linear way. However, the dimension of F may be large or infinite. Therefore, how to choose such a non-linear mapping is also a problem.

Fortunately, this problem can be solved with the kernel trick. Since the inner product of two samples which are non-linearly mapped can be represented by a kernel function:

$$k(x,y) = \langle \varphi(x), \varphi(y) \rangle_F,$$

wherein x, y belongs to the sample space. Using the kernel trick, the non-linear methods can be successfully implemented.

2. Kernel-based non-negative matrix factorization (KNMF) algorithm: The algorithm first maps a non-negative sample to a high-dimensional space F through a non-linear mapping $\varphi: R_+^m \to F$; finds a matrix of pre-images and coefficients, so that the mapped sample can be approximated as a linear combination of the mapped pre-images:

$$\varphi(x_j) \approx \sum_{i=1}^{r} h_{ij} \varphi(w_i),$$

wherein the feature $h_{ij}$ and pre-image $w_i$ are non-negative; the transformed matrix form is:

$$\varphi(X) \approx \varphi(W)H,$$

wherein X is the sample matrix, $\varphi(X)=[\varphi(x_1), \varphi(x_2), \ldots, \varphi(x_n)]$, $\varphi(W)=[\varphi(w_1), \varphi(w_2), \ldots, \varphi(w_r)]$, the objective function of the KNMF algorithm is $F(W,H) = \frac{1}{2} \|\varphi(X) - \varphi(W)H\|_F^2$, wherein the optimization problem to be solved is:

$$\min_{W,H} F(W, H) \text{ s.t. } W \geq 0 \text{ and } H \geq 0.$$

The iterative formula W and H can be obtained by the gradient descent method:

$$H^{(t+1)} = H^{(t)} \otimes K_{wx}^{(t)} \oslash (K_{ww}^{(t)} H^{(t)}),$$

$$W^{(t+1)} = W^{(t)} \otimes (XK_{wx}^{T(t)}) \oslash (W^{(t)} B K_{ww}^{T(t)}),$$

$$W^{(t+1)} = W^{(t+1)} \oslash S.$$

wherein B is a diagonal matrix $[B]_{jj} = \sum_{i=1}^{n} h_{ji}$, $[S]_{jr} = \sum_{i=1}^{m} [W]_{ir}$, $[S]_{jr} = \sum_{i=1}^{m} [W]_{ir}$ and $[K'_{ww}^{(t)}]_{ij} = d\langle w_i^{(t)}, w_j^{(t)} \rangle^{d-1}$. The solution to the optimization problem is obtained by the method of cross-iteration.

The shortcomings of the prior art are as follows:

(1) The polynomial kernel-based non-negative matrix factorization (PNMF) is more common in the kernel-based NMF algorithm. In the PNMF, samples are first mapped into a polynomial kernel space and then perform the NMF in the kernel space. However, the convergence point of the PNMF algorithm is not necessarily a fixed point, and can only use the polynomial kernel.

(2) In order to solve some problems in PNMF, the researchers proposed the PGKNMF, wherein the convergence point is fixed and there is no restriction on the use of kernel function; however, the PGKNMF still needs to learn the pre-images inaccurately.

BRIEF SUMMARY OF THE INVENTION

The invention provides a non-negative matrix factorization face recognition method based on kernel machine learning, which comprises the following steps:

A. each preset training sample image is represented as a column vector;

B. through the known kernel function and the training sample vector, a symmetric positive semi-definite kernel matrix $K_{xx}$ is constructed;

C. three objective functions are respectively established and the objective functions are minimized by the method of cross-iteration, and the new features of the training samples in the kernel space and two kernel matrices related to the non-linearly mapped samples are obtained.

D. through the two kernel matrices obtained in the learning phase, the test sample is projected into the kernel space to obtain the new features of the test sample in the kernel space.

E. according to the nearest neighbor method, the new features of the test sample are compared with the preset centers of the new features of each type of training sample to realize the classification and identification of the test sample.

As a further improvement of the invention, in Step C, the formula of cross-iteration is:

$$H^{(t+1)} = H^{(t)} \otimes K_{wx} \oslash (K_{ww} H),$$

$$K_{xw}^{(t+1)} = K_{xw}^{(t)} \otimes (K_{xx} H^T) \oslash (K_{xw}^{(t)} H H^T),$$

$$K_{ww}^{(t+1)} = K_{ww}^{(t)} \otimes (K_{wx} H^T + H K_{xw}) \oslash (K_{ww}^{(t)} H H^T + H H^T K_{ww}^{(t)}),$$

the final feature matrix H and two kernel matrices, $K_{wx}$ and $K_{ww}$, can be obtained by the method of cross-iteration.

As a further improvement of the invention, in Step C, the cross-iterative process comprises the following steps of:

(1) inputting the kernel matrix $K_{xx}$;
(2) initializing the matrices H, $K_{xw}$, $K_{ww}$;
(3) fixing $K_{xw}$, $K_{ww}$ and updating H;
(4) fixing H, $K_{ww}$ and updating $K_{xw}$;
(5) fixing H, $K_{xw}$ and updating $K_{ww}$;
(6) determining and verifying whether the stop condition is satisfied, if the condition is satisfied, perform Step (7); otherwise, perform Step (3);
(7) the approximate solutions of H, $K_{xw}$, $K_{ww}$ are obtained.

As a further improvement of the invention, in Step D, the new feature $H_Y$ of the test sample is obtained by the following three methods:

Method I:

the method of generalized inverse matrix directly by means of $K_{xw}$ iterated, comprising:

$$H_Y = K_{xw}^+ K_{xy},$$

then each column of the matrix $H_Y$ represents a new feature of the image to be classified;

Method II:

through the non-negative matrix factorization, $K_{xy}$ and $K_{xw}$ in $K_{xy} = K_{xw} H_Y$ remain unchanged and the non-negative $H_Y$ can be iterated by a non-negative matrix factorization formula:

$$H_Y^{(t+1)} = H_Y^{(t)} \otimes (K_{xw}^T K_{xy}) \oslash (K_{xw}^T K_{xw} H_Y^{(t)});$$

Method III:

through the non-negative sparse representation, $K_{xy}$ will be sparsely represented by $K_{xw}$, wherein $H_Y$ is a sparse coefficient matrix, and $H_Y$ can be obtained by the iterative formula:

$$H_Y^{(t+1)} = H_Y^{(t)} \otimes (K_{xw}^T K_{xy}) \oslash (K_{xw}^T K_{xw} H_Y^{(t)} + \lambda 1_{r \times d});$$

wherein $\lambda$ is a control parameter, $1_{r \times d}$ is an all-one matrix with the size of r×d.

As a further improvement of the invention, in Step E, a distance between a new feature of each test sample and a new feature center of each type of training sample is calculated, and then the test image is classified according to the nearest neighbor method as the nearest distance class.

The invention further provides a non-negative matrix factorization face recognition system based on kernel machine learning, comprising:

a representation module, used for representing each preset training sample image as a column vector;

a construction module, used for constructing a symmetric positive semi-definite kernel matrix $K_{xx}$ by the known kernel functions and training sample vectors;

a processing module, used for establishing three objective functions respectively and realizing the minimization of the objective function through the method of cross-iteration, and the new features of the training samples in the kernel space and two kernel matrices related to the non-linearly mapped samples are obtained;

a projection module, used for projecting the test sample into the kernel space through the two kernel matrices obtained in the learning phase to obtain the new features of the test sample in the kernel space;

a recognition module, used for comparing the new feature of the test sample with the preset center of the new feature of each type of training sample according to the nearest neighbor method to realize the classification and identification of the test sample.

As a further improvement of the invention, in the processing module, the formula of cross-iteration is:

$$H^{(t+1)} = H^{(t)} \otimes K_{wx} \oslash (K_{ww} H),$$

$$K_{xw}^{(t+1)} = K_{xw}^{(t)} \otimes (K_{xx} H^T) \oslash (K_{xw}^{(t)} H H^T),$$

$$K_{ww}^{(t+1)} = K_{ww}^{(t)} \otimes (K_{wx} H^T + H K_{xw}) \oslash (K_{ww}^{(t)} H H^T + H H^T K_{ww}^{(t)}),$$

The final feature matrix H and two kernel matrices, $K_{wx}$ and $K_{ww}$, can be obtained by the method of cross-iteration.

As a further improvement of the invention, the processing module comprises:

an input module, used for inputting the kernel matrix $K_{xx}$;

an initialization module, used for initializing the matrices H, $K_{xw}$, $K_{ww}$;

a first processing module, used for fixing $K_{xw}$, $K_{ww}$, and updating H;

a second processing module, used for fixing H, $K_{ww}$, and updating $K_{xw}$;

a third processing module, used for fixing H, $K_{xw}$ and updating $K_{ww}$;

a judging module, used for judging and verifying whether the stop condition is satisfied, and if the condition is satisfied, the approximate solutions of H, $K_{xw}$, $K_{ww}$ are obtained; otherwise, the first processing module is performed.

As a further improvement of the invention, in the projection module, the new feature $H_Y$ of the test sample is obtained by the following three methods:

Method I:
the method of generalized inverse matrix directly by means of $K_{xw}$ iterated, comprising:

$$H_Y = K_{xw}^+ K_{xy},$$

then each column of the matrix $H_Y$ represents a new feature of the image to be classified;

Method II:
through the non-negative matrix factorization, $K_{xy}$ and $K_{xw}$ in $K_{xy} = K_{xw} H_Y$ remain unchanged and the non-negative $H_Y$ can be iterated by a non-negative matrix factorization formula:

$$H_Y^{(t+1)} = H_Y^{(t)} \otimes (K_{xw}^T K_{xy}) \oslash (K_{xw}^T K_{xw} H_Y^{(t)});$$

Method III:
through the non-negative sparse representation, $K_{xy}$ will be sparsely represented by $K_{xw}$, wherein $H_Y$ is a sparse coefficient matrix, and $H_Y$ can be obtained by the iterative formula:

$$H_Y^{(t+1)} = H_Y^{(t)} \otimes (K_{xw}^T K_{xy}) \oslash (K_{xw}^T K_{xw} H_Y^{(t)} + \lambda 1_{r \times d}),$$

wherein $\lambda$ is a control parameter, $1_{r \times d}$ is an all-one matrix with the size of r×d.

As a further improvement of the invention, in the recognition module, a distance between a new feature of each test sample and a new feature center of each type of training sample is calculated, and then the test image is classified according to the nearest neighbor method as the nearest distance class.

The invention has the following beneficial effects: the invention avoids the learning of the inaccurate pre-image matrix by directly learning two kernel matrices, $K_{wx}$ and $K_{ww}$, and avoids the derivation of the kernel function in the iterative formula by changing the learning object, so that there is no limit to the selection of kernel function and a general algorithm for any kernel function is obtained.

DETAILED DESCRIPTION OF THE INVENTION

Figure 1:
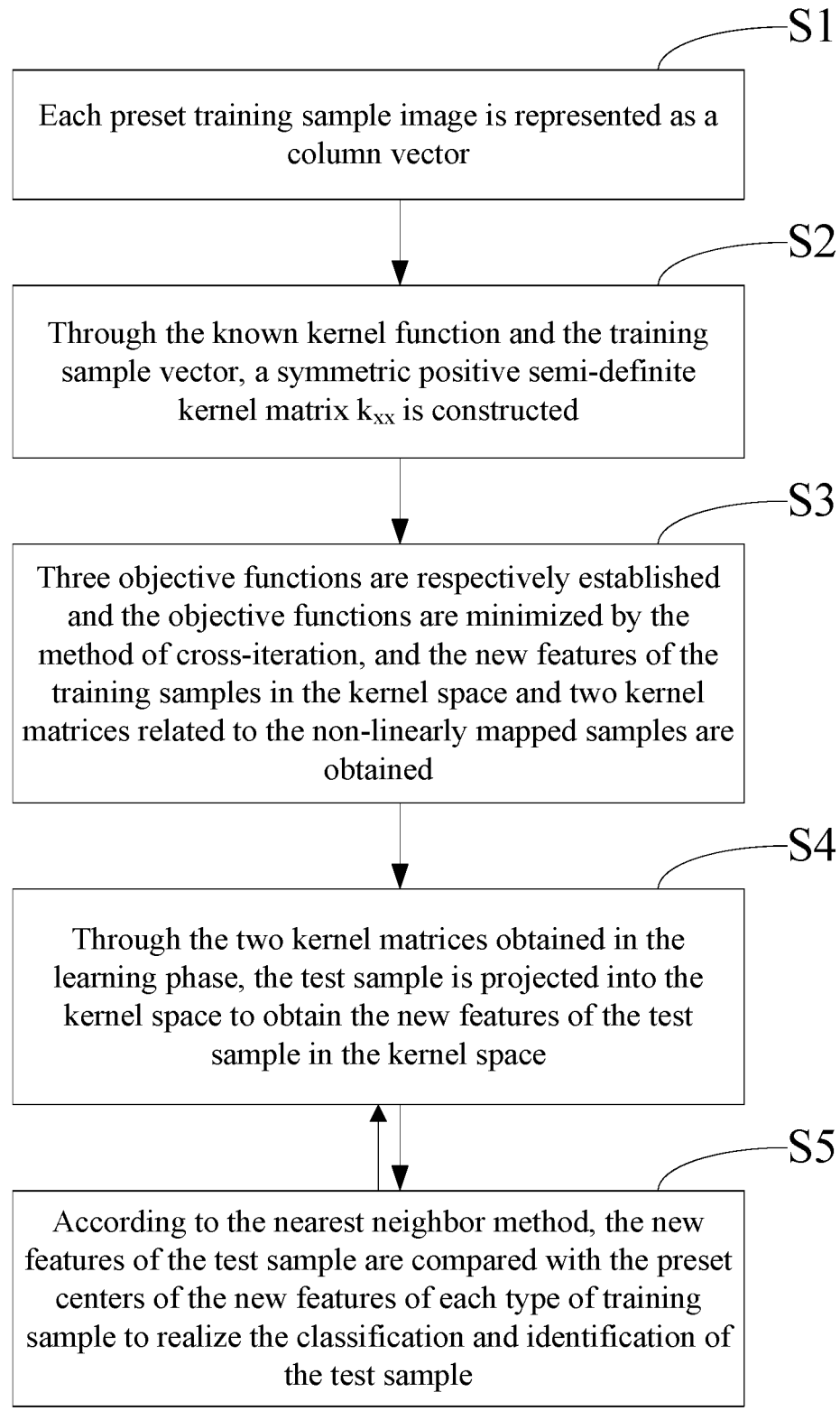
FIG. 1 is a flow chart of the method of the invention.

As shown in FIG. 1, the invention provides a non-negative matrix factorization face recognition method based on kernel machine learning, which comprises the following steps:

in Step S1, each preset training sample image is represented as a column vector;

in Step S2, through the known kernel function and the training sample vector, a symmetric positive semi-definite kernel matrix is $K_{xx}$ constructed;

in Step S3, three objective functions are respectively established and the objective functions are minimized by the method of cross-iteration, and the new features of the training samples in the kernel space and two kernel matrices related to the non-linearly mapped samples are obtained;

in Step S4, through the two kernel matrices obtained in the learning phase, the test sample is projected into the kernel space to obtain the new features of the test sample in the kernel space;

in Step S5, according to the nearest neighbor method, the new features of the test sample are compared with the preset centers of the new features of each type of training sample to realize the classification and identification of the test sample.

Figure 2:
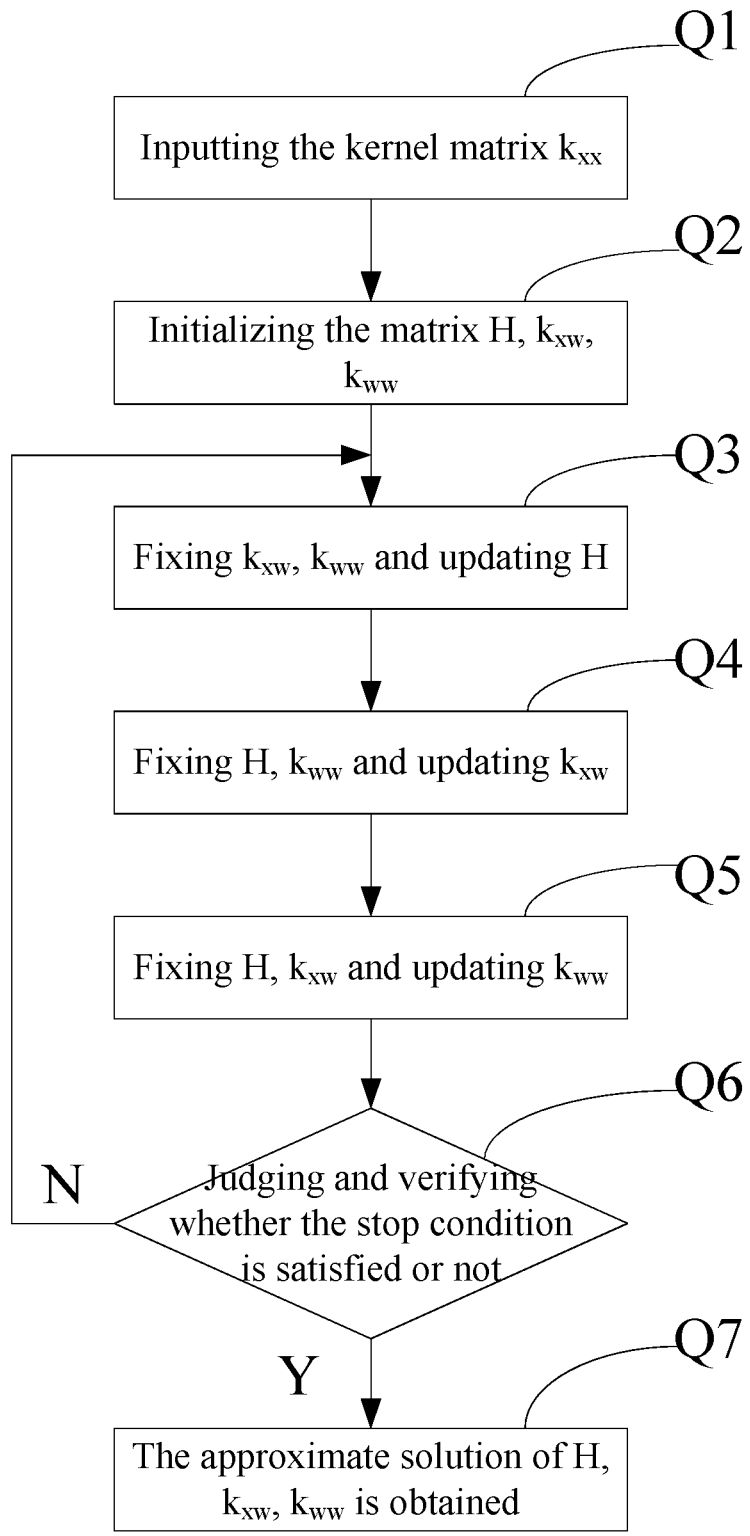
FIG. 2 is a flow chart of cross-iteration of the invention.

As shown in FIG. 2, the cross-iteration in the invention comprises the following steps:

Step Q1: inputting the kernel matrix $K_{xx}$;

Step Q2: initializing the matrices H, $K_{xw}$, $K_{ww}$;

Step Q3: fixing $K_{xw}$, $K_{ww}$ and updating H;

Step Q4: fixing H, $K_{ww}$ and updating $K_{xw}$;

Step Q5: fixing H, $K_{xw}$ and updating $K_{ww}$;

Step Q6: determining whether the verification satisfies the stop condition, if the condition is satisfied, perform Step Q7; otherwise, perform Step Q3;

Step Q7: the approximate solution of H, $K_{xw}$, $K_{ww}$ is obtained.

X is set as a training sample matrix and the sample matrix is mapped to a high-dimensional space through a non-linear mapping $\varphi$, intended to represent the mapped sample as a linear combination of the mapped pre-images:

$$\varphi(X)=\varphi(W)H.$$

To avoid the learning of the inaccurate pre-image, three error functions are established:

$$F_1 = \|\varphi(X) - \varphi(W)H\|_F^2$$
$$= tr[K_{xx} - K_{xw}H - H^T K_{wx} + H^T K_{ww} H],$$

$$F_2 = \frac{1}{2}\|\varphi(X)^T[\varphi(X) - \varphi(W)H]\|_F^2$$
$$= \frac{1}{2}tr[K_{xx}K_{xx}^T + K_{xw}HH^T K_{wx} - K_{xx}H^T K_{wx} - K_{xw}HK_{xx}],$$

$$F_3 = \|\varphi(X)^T[\varphi(X) - \varphi(W)H]\|_F^2$$
$$= tr(K_{wx}K_{xw} + K_{ww}HH^T K_{ww} - K_{wx}H^T K_{ww} - K_{ww}HK_{xw}),$$

wherein $[K_{xx}]_{ij}=\langle \varphi(x_i),\varphi(x_j)\rangle=k(x_i,x_j)$, the RBF kernel function, $$k(x, y) = \exp\left(-\frac{\|x - y\|^2}{t}\right),$$

t>0, is used in the invention. $[K_{ww}]_{ij}=\langle \varphi(x_i),\varphi(x_j)\rangle=k(x_i,x_j)$, $[K_{xw}]_{ij}=\langle \varphi(x_i),\varphi(x_j)\rangle=k(x_i,x_j)$, and $K_{wx}=K_{xw}^T$.

The three objective functions essentially reflect the degree of approximation after the decomposition of $\varphi(X)$.

The problem of solving the feature matrix then evolves into three sub-problems. Two matrices in the feature matrix H and kernel matrix $K_{xw}$, $K_{ww}$, are fixed respectively, and the remaining one matrix is studied, that is:

$$\min F_1(H), \text{ s.t. } H \geq 0 \quad (1)$$

$$\min F_2(K_{xw}) \text{ s.t. } K_{xw} \geq 0 \text{ and} \quad (2)$$

$$\min F_3(K_{ww}) \text{ s.t. } K_{ww} \geq 0. \quad (3)$$

By solving these three sub-problems, a new feature H and two kernel matrices, $K_{xw}$, $K_{ww}$, of the mapped training sample are obtained.

Learning of the feature matrix H:

For Sub-problem (1), two kernel matrices, $K_{xw}$, $K_{ww}$, are fixed and the feature matrix H are studied. The iterative formula of H is obtained by the gradient descent method. According to the gradient descent method:

$$H^{(t+1)}=H^{(t)}-\rho_1(H^{(t)})\otimes\nabla F_1(H^{(t)}), \quad (4)$$

wherein $\rho_1(H^{(t)})$ is a step matrix, $\nabla F_1(H)$ is the gradient of $F_1$ related to H.

$$\nabla F_1(H)=K_{ww}H-K_{wx}.$$

To ensure the non-negativeness of H in every iteration, the step matrix is selected as:

$$\rho_1=H\oslash(K_{ww}H),$$

The selected step matrix $\rho_1$ is taken into the iterative formula H that can be obtained from (4), with the theorem as follows.

Theorem 1: the kernel matrices, $K_{wx}$ and $K_{ww}$, are fixed, the objective function $F_1$ is non-increasing, and the feature matrix H in Sub-problem (1) is updated by the following iterative method:

$$H^{(t+1)}=H^{(t)}\otimes K_{wx}\oslash(K_{ww}H).$$

Learning of the kernel matrix $K_{xw}$:

For Sub-problem (2), according to the gradient descent method:

$$K_{xw}^{(t+1)}=K_{xw}^{(t)}-\rho_2^{(t)}\otimes\nabla F_2(K_{xw}^{(t)}), \quad (5)$$

wherein $\rho_2$ is a step matrix, $\nabla F_2(K_{xw})$ is the gradient of $F_2$ related to the objective function $K_{xw}$.

$$\nabla F_2(K_{xw})=K_{xw}HH^T-K_{xx}H^T.$$

To ensure the non-negativeness of $K_{xw}$ in every iteration, the step matrix $\rho_2$ is selected as:

$$\rho_2^{(t)}=K_{wx}^{(t)}\oslash(K_{xw}^{(t)}HH^T),$$

$\rho_2$ is taken into (5) to obtain the iterative formula of $K_{xw}$, with the theorem as follows:

Theorem 2: the kernel matrices, H and $K_{ww}$, are fixed, the objective function $F_2$ is non-increasing, and the feature matrix $K_{xw}$ in Sub-problem (2) is updated by the following iterative method:

$$K_{xw}^{(t+1)}=K_{xw}^{(t)}\otimes(K_{xx}H^T)\oslash(K_{xw}^{(t)}HH^T).$$

Learning of the kernel matrix $K_{ww}$:

For Sub-problem (3), according to the gradient descent method:

$$K_{ww}^{(t+1)}=K_{ww}^{(t)}-\rho_3^{(t)}\otimes\nabla F_3(K_{ww}^{(t)}), \quad (6)$$

wherein $\rho_3$ is a step matrix, $\nabla F_3(K_{ww})$ is the gradient of $F_3$ related to the objective function $K_{ww}$.

$$\nabla F_3(K_{ww})=K_{ww}HH^T+HH^TK_{ww}-K_{wx}H^T-HK_{xw},$$

To ensure the non-negativeness of $K_{ww}$ in every process of iteration, the step matrix $\rho_3$ is selected as:

$$\rho_3^{(t)}=K_{ww}^{(t)}\oslash(K_{ww}^{(t)}HH^T+HH^TK_{ww}^{(t)}),$$

$\rho_3$ is taken into (6) to obtain the iterative formula of $K_{ww}$, with the theorem as follows:

Theorem 3: the feature matrix H and kernel matrix $K_{xy}$ are fixed, the objective function $F_3$ is non-increasing, and the feature matrix $K_{ww}$ in Sub-problem (3) is updated by the following iterative method:

$$K_{ww}^{(t+1)}=K_{ww}^{(t)}\otimes(K_{wx}H^T+HK_{xw})\oslash(K_{ww}^{(t)}HH^T+HH^TK_{ww}^{(t)}).$$

To sum up, through Theorem 1, Theorem 2 and Theorem 3, the iterative formula of the non-negative matrix factorization algorithm based on kernel machine learning proposed in the present patent can be obtained:

$$H^{(t+1)}=H^{(t)}\otimes K_{wx}\oslash(K_{ww}H),$$

$$K_{xw}^{(t+1)}=K_{xw}^{(t)}\otimes(K_{xx}H^T)\oslash(K_{xw}^{(t)}HH^T),$$

$$K_{ww}^{(t+1)}=K_{ww}^{(t)}\otimes(K_{wx}H^T+HK_{xw})\oslash(K_{ww}^{(t)}HH^T+HH^TK_{ww}^{(t)}),$$

The final feature matrix H and two kernel matrices, $K_{wx}$ and $K_{ww}$, can be obtained by the method of cross-iteration.

Extraction of Features:

For the test sample Y, the matrix of test sample mapped to the kernel space by non-linear mapping is $\phi(Y)$, which is represented by the mapped pre-image $\phi(W)$ in the kernel space:

$$\varphi(Y)=\varphi(W)H_Y \Rightarrow$$

$$\varphi(X)^T\varphi(Y)=\varphi(X)^T\varphi(W)H_Y \Rightarrow$$

$$K_{xy}=K_{xw}H_Y$$

wherein $Y \in R^{m \times d}$ is the matrix of all the test samples, $[K_{xy}]_{ij}=k(x_i,y_j)$. The new feature $H_Y$ of the test sample is obtained by the following three methods:

Method I:

the method of generalized inverse matrix directly by means of $K_{xw}$ iterated, comprising:

$$H_Y=K_{xw}^+K_{xy}.$$

then each column of the matrix $H_Y$ represents a new feature of the image to be classified.

Method II:

through the non-negative matrix factorization, $K_{xy}$ and $K_x$, in $K_{xy}=K_{xw}H_Y$ remain unchanged and the non-negative $H_Y$ can be iterated by a non-negative matrix factorization formula:

$$H_Y^{(t+1)}=H_Y^{(t)} \otimes (K_{xw}^T K_{xy}) \oslash (K_{xw}^T K_{xw} H_Y^{(t)});$$

Method III:

through the non-negative sparse representation, $K_{xy}$ will be sparsely represented by $K_{xw}$, wherein $H_Y$ is a sparse coefficient matrix, and $H_Y$ can be obtained by the iterative formula:

$$H_Y^{(t+1)}=H_Y^{(t)} \otimes (K_{xw}^T K_{xy}) \oslash (K_{xw}^T K_{xw} H_Y^{(t)} + \lambda 1_{r \times d});$$

wherein $\lambda$ is a control parameter, $1_{r \times d}$ is an all-one matrix with the size of r×d.

Through the iterative H, the center of the new feature of each type of training sample is obtained. A distance between a new feature of each test sample and a new feature center of each type of training sample is calculated, and then the test image is classified according to the nearest neighbor method as the nearest distance class.

The invention further provides a non-negative matrix factorization face recognition system based on kernel machine learning, comprising:

a representation module, used for representing each preset training sample image as a column vector;

a construction module, used for constructing a symmetric positive semi-definite kernel matrix $K_{xx}$ by the known kernel functions and training sample vectors;

a processing module, used for establishing three objective functions respectively and realizing the minimization of the objective function through the method of cross-iteration, and the new features of the training samples in the kernel space and two kernel matrices related to the non-linearly mapped samples are obtained;

a projection module, used for projecting the test sample into the kernel space through the two kernel matrices obtained in the learning phase to obtain the new features of the test sample in the kernel space;

a recognition module, used for comparing the new feature of the test sample with the preset center of the new feature of each type of training sample according to the nearest neighbor method to realize the classification and identification of the test sample.

In the processing module, the formula of cross-iteration is:

$$H^{(t+1)}=H^{(t)} \otimes K_{wx} \oslash (K_{ww}H),$$

$$K_{xw}^{(t+1)}=K_{xw}^{(t)} \otimes (K_{xx}H^T) \oslash (K_{xw}^{(t)}HH^T),$$

$$K_{ww}^{(t+1)}=K_{ww}^{(t)} \otimes (K_{wx}H^T+HK_{xw}) \oslash (K_{ww}^{(t)}HH^T+HH^T K_{ww}^{(t)}),$$

The final feature matrix H and two kernel matrices, $K_{wx}$ and $K_{ww}$, can be obtained by the method of cross-iteration.

The processing module, comprising:

an input module, used for inputting the kernel matrix $K_{xx}$;

an initialization module, used for initializing the matrices H, $K_{xw}$, $K_{ww}$;

a first processing module, used for fixing $K_{xw}$, $K_{ww}$ and updating H;

a second processing module, used for fixing H, $K_{ww}$ and updating $K_{xw}$;

a third processing module, used for fixing H, $K_{xw}$, and updating $K_{ww}$;

a judging module, used for judging and verifying whether the stop condition is satisfied, and if the condition is satisfied, the approximate solution of H, $K_{xw}$, $K_{ww}$ is obtained; otherwise, the first processing module is performed.

In the projection module, the new feature $H_Y$ of the test sample is obtained by the following three methods:

Method I:

the method of generalized inverse matrix directly by means of $K_{xw}$ iterated, comprising:

$$H_Y=K_{xw}^+K_{xy},$$

then each column of the matrix $H_Y$ represents a new feature of the image to be classified;

Method II:

through the non-negative matrix factorization, $K_{xy}$ and $K_{xw}$ in $K_{xy}=K_{xw}H_Y$ remain unchanged and the non-negative $H_Y$ can be iterated by a non-negative matrix factorization formula:

$$H_Y^{(t+1)}=H_Y^{(t)} \otimes (K_{xw}^T K_{xy}) \oslash (K_{xw}^T K_{xw} H_Y^{(t)});$$

Method III:

through the non-negative sparse representation, $K_{xy}$ will be sparsely represented by $K_{xw}$, wherein $H_Y$ is a sparse coefficient matrix, and $H_Y$ can be obtained by the iterative formula:

$$H_Y^{(t+1)}=H_Y^{(t)} \otimes (K_{xw}^T K_{xy}) \oslash (K_{xw}^T K_{xw} H_Y^{(t)} + \lambda 1_{r \times d});$$

wherein $\lambda$ is a control parameter, $1_{r \times d}$ is an all-one matrix with the size of r×d.

In the recognition module, a distance between a new feature of each test sample and a new feature center of each type of training sample is calculated, and then the test image is classified according to the nearest neighbor method as the nearest distance class.

The beneficial effects of the invention are as below:

1. the invention avoids the learning of the inaccurate pre-image matrix by directly learning two kernel matrices, $K_{wx}$ and $K_{ww}$;

2. the invention avoids the derivation of the kernel function in the iterative formula by changing the learning object, so that there is no limit to the selection of kernel function and a general algorithm for any kernel function is obtained;

3. through the new iterative formula obtained, such an algorithm generalized for any kernel function becomes more convenient;

4. through the comparison of the experimental data in a public common face database, the algorithm achieves a higher recognition accuracy by verifying the effectiveness of the new algorithm.

TABLE 1

| Recognition rate of the algorithm proposed in the invention and the traditional PNMF algorithm in the ORL face database (%) | | | | | | | | |
|---|---|---|---|---|---|---|---|---|
| TN | 2 | 3 | 4 | 5 | 6 | 7 | 8 | 9 |
| PNMF | 80.97 | 85.76 | 89.91 | 92.50 | 94.04 | 93.74 | 95.14 | 93.57 |
| Proposed Method | 85.89 | 86.98 | 92.24 | 93.50 | 95.26 | 95.96 | 96.83 | 98.82 |

Figure 3:
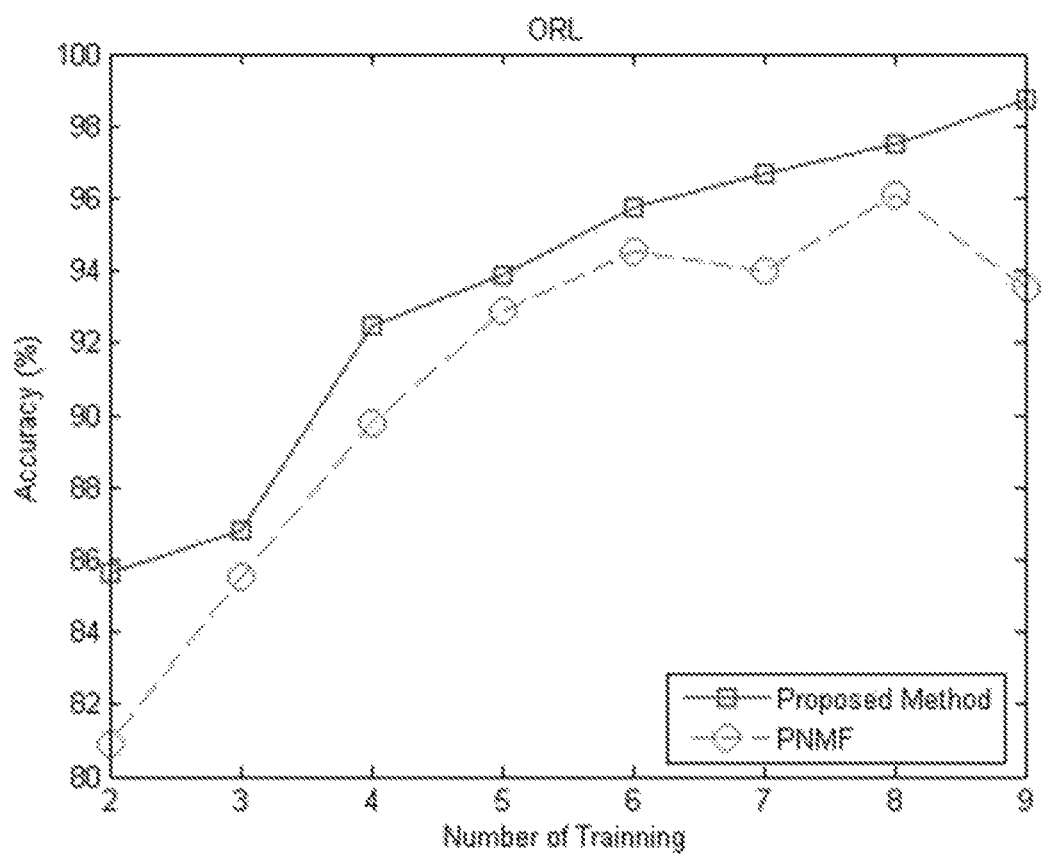
FIG. 3 is a diagram of the recognition rate of the method of the invention and the traditional PNMF algorithm in the ORL face database.

FIG. 3 is a diagram of the recognition rate of the method of the invention and the traditional PNMF algorithm in the ORL face database.

The invention only needs to learn the kernel matrix, and the method is simple and practical by establishing three different objective functions to learn the feature matrix and two kernel matrices respectively.

Explanation of Key Words

Non-negative matrix factorization (NMF): the idea of NMF is to approximately factorize the non-negative sample matrix X to the product of two non-negative matrices:

$$X_{m\times n} \approx W_{m\times r} H_{r\times n},$$

wherein $W_{m\times r}$ and $H_{r\times n}$ are non-negative matrices. Each column of W is called the pre-image matrix and H is a coefficient matrix.

Kernel non-negative matrix factorization (KNMF): the idea of KNMF is to map a non-negative sample matrix into a high-dimensional space through a non-linear mapping $\varphi$. The non-negative sample matrix to be mapped is approximately factorized into the product of the pre-image matrix and the coefficient matrix that are mapped:

$$\varphi(X_{m\times n}) \approx \varphi(W_{m\times r}) H_{r\times n},$$

wherein $W_{m\times r}$ and $H_{r\times n}$ are non-negative matrices.

The foregoing are further detailed for the invention in combination with detailed preferable embodiments, but are not intended to limit detailed embodiments of the invention. Those skilled in the art can make a variety of simple deductions or variations without deviating from the principle of the invention, and all these should be covered in the protection scope of the invention.

What is claimed is:

1. A non-negative matrix factorization face recognition method based on kernel machine learning, comprising the following steps:
   (A) each preset training sample image is represented as a column vector;
   (B) through a known kernel function and a known training sample vector, a symmetric positive semi-definite kernel matrix $K_{xx}$ is constructed;
   (C) three objective functions are respectively established and the objective functions are minimized by a method of cross-iteration, and new features of the training samples in a kernel space and two kernel matrices related to non-linearly mapped samples are obtained;
   (D) through the two kernel matrices obtained in the learning phase, a test sample is projected into the kernel space to obtain new feature of the test sample in the kernel space;
   (E) according to a nearest neighbor method, the new features of the test sample are compared with preset centers of the new features of each type of training sample to realize a classification and identification of the test sample,
   wherein in Step E, a distance between a new feature of each test sample and a new feature center of each type of training sample is calculated, and then the test image is classified according to the nearest neighbor method as a nearest distance class.

2. The non-negative matrix factorization face recognition method as claimed in claim 1, wherein in Step C, the formulae of cross-iteration are:

$$H^{(t+1)} = H^{(t)} \otimes K_{wx} \oslash (K_{ww} H),$$

$$K_{xw}^{(t+1)} = K_{xw}^{(t)} \otimes (K_{xx} H^T) \oslash (K_{xw}^{(t)} H H^T),$$

$$K_{ww}^{(t+1)} = K_{ww}^{(t)} \otimes (K_{wx} H^T + H K_{xw}) \oslash (K_{ww}^{(t)} H H^T + H H^T K_{ww}^{(t)}),$$

wherein a final feature matrix H and the two kernel matrices, $K_{wx}$ and $K_{ww}$, can be obtained by the method of cross-iteration.

3. The non-negative matrix factorization face recognition method as claimed in claim 1, wherein in Step C, the cross-iterative process comprises the following steps of:
   (1) inputting the kernel matrix $K_{xx}$;
   (2) initializing matrices H, $K_{xw}$, $K_{ww}$;
   (3) fixing $K_{xw}$, $K_{ww}$ and updating H;
   (4) fixing H, $K_{ww}$ and updating $K_{xw}$;
   (5) fixing H, $K_{xw}$ and updating $K_{ww}$;
   (6) determining and verifying whether a stop condition is satisfied, if the stop condition s satisfied, perform Step (7); otherwise, perform Step (3);
   (7) the approximate solutions of H, $K_{xw}$, $K_{ww}$ are obtained.

4. The non-negative matrix factorization face recognition method as claimed in claim 1, wherein in Step D, the new feature $H_Y$ of the test sample is obtained by the following three methods:

Method I:
method of directly utilizing generalized inverse matrix of iterated $K_{xw}$, comprising:

$$H_Y = K_{xw}^+ K_{xy},$$

then each column of the matrix $H_Y$ represents a new feature of the image to be classified;

Method II:
through non-negative matrix factorization, $K_{xy}$ and $K_{xw}$ in $K_{xy} = K_{xw} H_Y$ remain unchanged and the non-negative $H_Y$ can be iterated by a non-negative matrix factorization formula:

$$H_Y^{(t+1)} = H_Y^{(t)} \otimes (K_{xw}^T K_{xy}) \oslash (K_{xw}^T K_{xw} H_Y^{(t)});$$

Method III:
through a non-negative sparse representation, $K_{xy}$ will be sparsely represented by $K_{xw}$, wherein $H_Y$ is a sparse coefficient matrix, and $H_Y$ can be obtained by the iterative formula:

$$H_Y^{(t+1)} = H_Y^{(t)} \otimes (K_{xw}^T K_{xy}) \oslash (K_{xw}^T K_{xw} H_Y^{(t)} + \lambda 1_{r\times d}),$$

wherein, $\lambda$ is a control parameter, $1_{r\times d}$ is an all-one matrix with a size of r×d.

5. A non-negative matrix factorization face recognition system based on kernel machine learning, comprising:
   a register, storing instructions;
   a processor, coupled to the register and configured to execute the instructions to:
   represent each preset training sample image as a column vector;
   construct a symmetric positive semi-definite kernel matrix $K_{xx}$ by a known kernel function and the known training sample vectors;

establish three objective functions respectively and realizing a minimization of the objective function through a method of cross-iteration, and new features of the training samples in a kernel space and two kernel matrices related to non-linearly mapped samples are obtained;

project a test sample into the kernel space through the two kernel matrices obtained in the learning phase to obtain new features of the test sample in the kernel space;

compare the new feature of the test sample with a preset center of the new feature of each type of training sample according to the nearest neighbor method to realize a classification and identification of the test sample, wherein the processor is configured to execute the instructions to calculate a distance between a new feature of each test sample and a new feature center of each type of training sample, and then classify the test image according to the nearest neighbor method as the nearest distance class.

6. The non-negative matrix factorization face recognition system as claimed in claim 5, wherein formula of the cross-iteration is:

$$H^{(t+1)} = H^{(t)} \otimes K_{wx} \oslash (K_{ww} H),$$

$$K_{xw}^{(t+1)} = K_{xw}^{(t)} \otimes (K_{xx} H^T) \oslash (K_{xw}^{(t)} H H^T),$$

$$K_{ww}^{(t+1)} = K_{ww}^{(t)} \otimes (K_{wx} H^T + H K_{xw}) \oslash (K_{ww}^{(t)} H H^T + H H^T K_{ww}^{(t)}),$$

wherein a final feature matrix H and the two kernel matrices, $K_{wx}$ and $K_{ww}$, can be obtained by the method of cross-iteration.

7. The non-negative matrix factorization face recognition system as claimed in claim 5, wherein the processor is further configured to execute the instructions to:

input the kernel matrix $K_{xx}$;

initialize matrices H, $K_{xw}$, $K_{ww}$;

fix $K_{xw}$, $K_{ww}$ and updating H;

fix H, $K_{ww}$ and updating $K_{xw}$;

fix H, $K_{xw}$ and updating $K_{ww}$;

judge and verify whether a stop condition is satisfied, and if the stop condition is satisfied, the approximate solutions of H, $K_{xw}$, $K_{ww}$ are obtained; otherwise, the matrices $K_{xw}$, $K_{ww}$ are fixed and H is updated.

8. The non-negative matrix factorization face recognition system as claimed in claim 5, wherein the processor is further configured to execute the instructions to obtain the new feature $H_Y$ of the test sample by the following three methods:

Method I:

method of directly utilizing generalized inverse matrix of iterated $K_{xw}$, comprising:

$$H_Y = K_{xw}^+ K_{xy},$$

then each column of the matrix $H_Y$ represents a new feature of the image to be classified;

Method II:

through the non-negative matrix factorization, $K_{xy}$ and $K_{xw}$ in $K_{xy} = K_{xw} H_Y$ remain unchanged and the non-negative $H_Y$ can be iterated by a non-negative matrix factorization formula:

$$H_Y^{(t+1)} = H_Y^{(t)} \otimes (K_{xw}^T K_{xy}) \oslash (K_{xw}^T K_{xw} H_Y^{(t)});$$

Method III:

through a non-negative sparse representation, $K_{xy}$ will be sparsely represented by $K_{xw}$, wherein $H_Y$ is a sparse coefficient matrix, and $H_Y$ can be obtained by the iterative formula:

$$H_Y^{(t+1)} = H_Y^{(t)} \otimes (K_{xw}^T K_{xy}) \oslash (K_{xw}^T K_{xw} H_Y^{(t)} + \lambda 1_{r \times d}),$$

wherein, $\lambda$ is a control parameter, $1_{r \times d}$ is an all-one matrix with a size of r×d.

* * * * *